Figure 1:
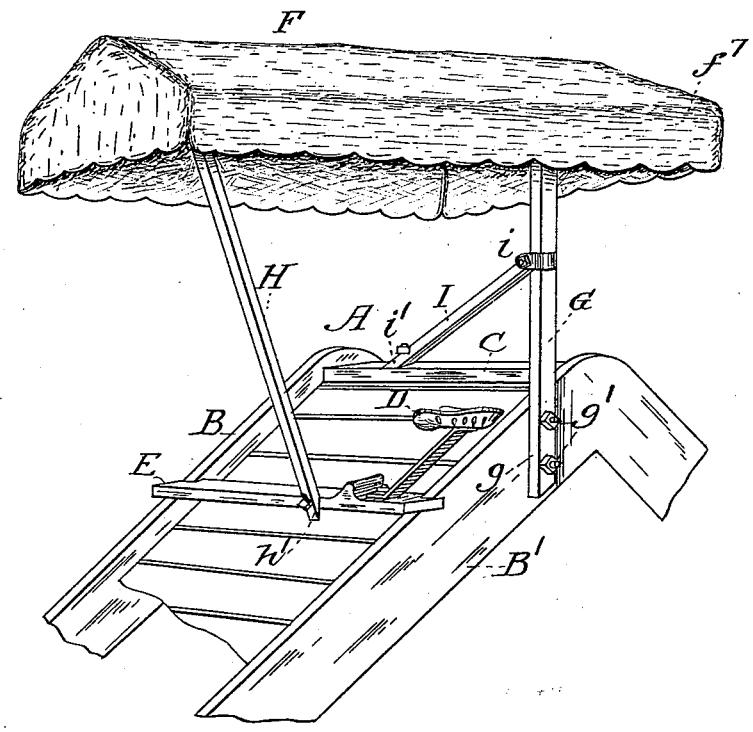

(No Model.) 2 Sheets—Sheet 1.

F. W. HUSEMANN.
HARVESTER.

No. 508,317. Patented Nov. 7, 1893.

WITNESSES
Edward W Farrell
A. Bonville

INVENTOR
Frederick W Husemann
by C D Moody
his atty (No Model.) 2 Sheets—Sheet 2.
F. W. HUSEMANN.
HARVESTER.
No. 508,317. Patented Nov. 7, 1893.
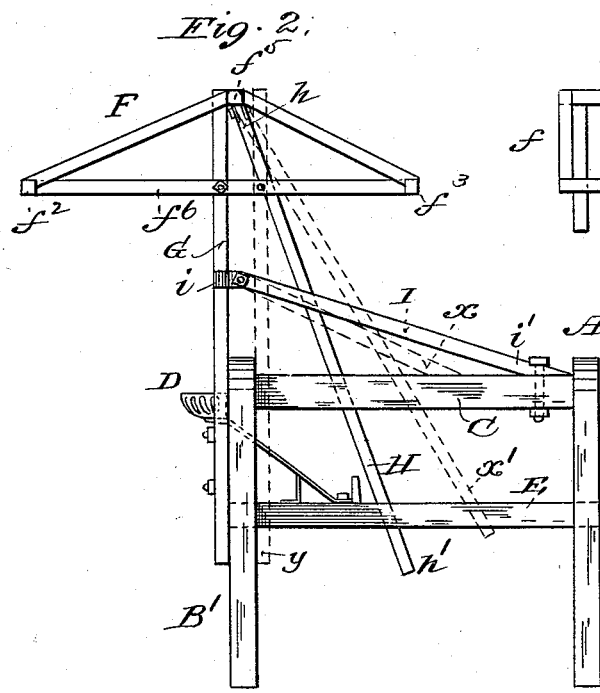
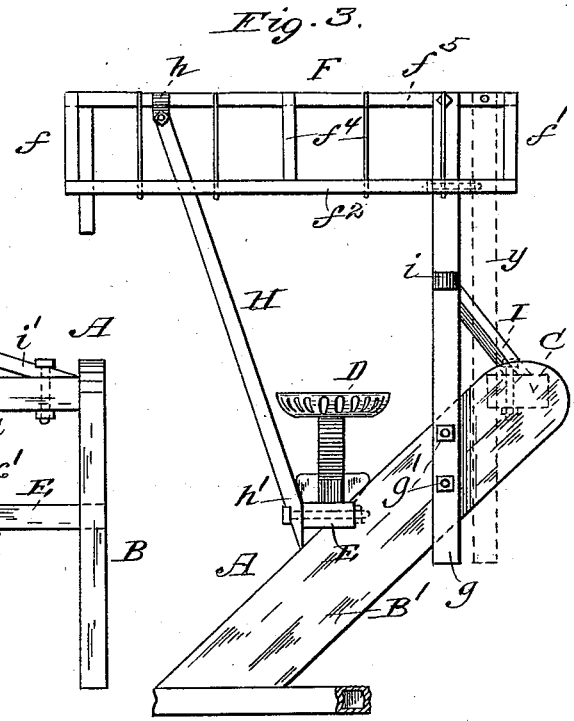
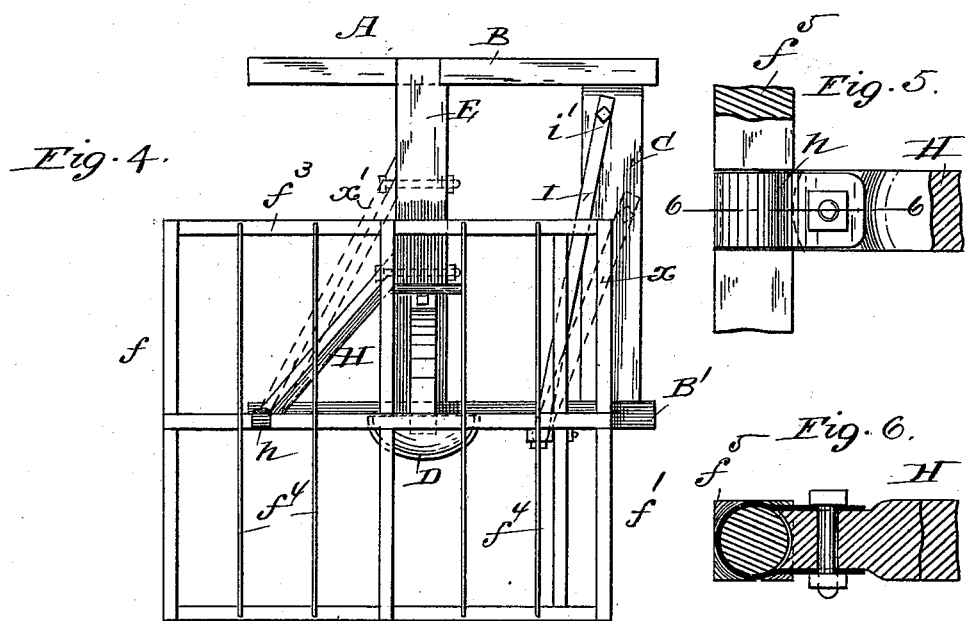
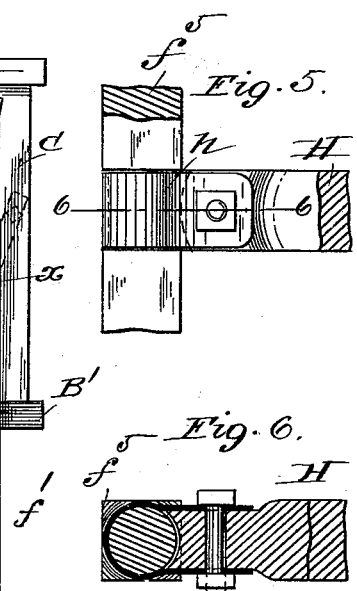
WITNESSES
Edward Hurrell
A. Bonville
INVENTOR
Frederick W. Husemann
by C. D. Moody, atty

UNITED STATES PATENT OFFICE.

FREDERICK W. HUSEMANN, OF BLACK JACK, MISSOURI.

HARVESTER.

SPECIFICATION forming part of Letters Patent No. 508,317, dated November 7, 1893.

Application filed September 26, 1892. Serial No. 446,945. (No model.)

*To all whom it may concern:*

Be it known that I, FREDERICK W. HUSEMANN, of Black Jack, St. Louis county, Missouri, have made a new and useful Improvement in Harvesters, of which the following is a full, clear, and exact description.

My improvement is a canopy for screening the driver and constructed in a peculiar manner to adapt it to be readily fitted to any of the various reaper and harvester constructions generally in use, substantially as is hereinafter set forth and claimed, aided by the annexed drawings, making part of this specification, in which—

Figure 1 is a general view in perspective showing the improvement in position; Fig. 2 an elevation, from the outer side of the harvester or reaper, showing the canopy and harvester frames; Fig. 3 a rear elevation of the parts of Fig. 2; Fig. 4 a plan of the parts of Fig. 2, and Figs. 5 and 6 details, upon an enlarged scale, Fig. 5 being a side view of one of the universal joints employed in the construction of some of the canopy-supports, and Fig. 6 being a section on the line 6—6 of Fig. 5.

The same letters of reference denote the same parts.

A represents that portion of a reaper or harvester frame which extends over the drive-wheel. Only that portion of the frame which is necessary to an understanding of the improvement is shown.

B B' represent its ends, C the bar which usually connects the ends at the top thereof, D the driver's seat, and E the board which supports the seat, all of which are constructed and united in the customary manner, but capable of being varied more or less according to the special designs of different makers.

F represents any canopy suitable for shielding the driver. I desire not to be restricted to any special form so long as the canopy is suited for the purpose in view. Its frame work, in the present instance, consists mainly of the end bars $f$, $f'$, the side bars $f^2$, $f^3$, the rafters $f^4$ of various shapes, the ridge pole $f^5$, and the cross bar $f^6$, all suitably united to form in effect a rectangular frame of any desired size and proportions, substantially as shown. Any suitable material may be employed for the frame cover $f^7$. Now, to properly sustain the canopy in position, and at the same time enable it to be readily attached to any of the various sizes and styles of reapers and harvesters, I provide the canopy with the main standard G, an auxiliary standard H, and a brace I. The standard G, at its upper end is attached to the canopy by securing it to the bar, $f^6$, and the ridge pole. The auxiliary standard H at its upper end $h$ is connected with the ridge-pole of the canopy and, by means of a universal joint, (which is also preferably the means for connecting the standard with the ridge pole) which enables the standard to be moved either forward or backward or sidewise to enable its lower end, $h'$, to be connected with the seat-board E or other part of the harvester frame. The brace I, is connected with the standard G, and it is adapted, and preferably by means of the universal joint $i$, which connects it with the standard, to be adjusted to enable its lower end $i'$ to meet this or that part of the frame A and preferably the bar C, as shown.

The canopy is attached in position as follows: After adjusting it to the desired level its main standard, G, at its lower end $g$, and preferably by means of the bolts $g'$, is secured to the frame-end B'. The standard H, which is of sufficient length to enable it to connect with the seat-board or other part of the frame, at any desired angle of adjustment, is then turned into the proper position to meet that part of the frame A with which it is to immediately connect, and preferably the seat-board, and is then bolted or otherwise secured thereto, substantially as shown. The standard is an important auxiliary to the main standard G, as it serves to sustain more especially the inner end of the canopy. The brace I serves to stiffen the standard G, and for the same reason that the standard H is made adjustable the brace I is made adjustable. The brace I is adjusted in an analogous manner to bring its lower end, $i'$, into position to be bolted or otherwise secured to the harvester-frame, and preferably to the bar C thereof, substantially as shown.

The canopy with its described standards and braces is in effect an article of manufacture adapted to all of the well known harvesting or reaping machines, and which, in the manner described, can be readily attached to any one thereof. Different makes of machines, as is known, vary more or less in respect to the construction of the frame, but, in the manner described, the canopy can be easily fitted to almost any of them. The adjustableness of the auxiliary standard and brace is a leading feature of the improvement, and I desire not to be restricted to the bar C, and the seat-board of the harvester-frame, and much less to any particular parts of said bar and board, as the special points for attaching them, as said standard and brace might be otherwise connected with the reaper or harvester-frame. I however consider the special mode shown of attaching the parts named the most desirable one. The broken lines $x, x'$ suggest some of the possible adjustments of the canopy supports, H and I, and the broken lines $y, y$, possible adjustments of the standard G.

I claim—

The combination of the canopy having a ridge pole, the main standard rigidly secured to said pole, the auxiliary standard secured to said pole by a universal joint, and the brace attached to the rigid standard by a universal joint, with the frame having bar C, and the seat-board, said auxiliary standard and brace being adjustable respectively on the seat board and the top bar C, substantially as described.

Witness my hand this 24th day of September, 1892.

FREDERICK W. HUSEMANN.

Witnesses:
C. D. MOODY,
A. BONVILLE.